United States Patent
Stout et al.

(10) Patent No.: US 10,893,598 B2
(45) Date of Patent: Jan. 12, 2021

(54) TRANSMISSION OF LUMINAIRE MAINTENANCE INFORMATION

(71) Applicants: Osram Sylvania Inc., Wilmington, MA (US); Osram GmbH, Munich (DE)

(72) Inventors: Barry Stout, Beverly, MA (US); Henry Feil, Unterhaching (DE); Nitin Kumar, Munich (DE)

(73) Assignee: OSRAM SYLVANIA Inc., Wilmington, MA (US)

(*) Notice: Subject to any disclaimer, the term of this patent is extended or adjusted under 35 U.S.C. 154(b) by 12 days.

(21) Appl. No.: 16/257,291

(22) Filed: Jan. 25, 2019

(65) Prior Publication Data
US 2020/0245424 A1 Jul. 30, 2020

(51) Int. Cl.
*H05B 47/20* (2020.01)
*H04B 10/116* (2013.01)
*G01S 1/04* (2006.01)
*H04B 10/114* (2013.01)
*H05B 47/19* (2020.01)
*H04W 4/02* (2018.01)

(52) U.S. Cl.
CPC .............. *H05B 47/20* (2020.01); *G01S 1/042* (2013.01); *G01S 1/045* (2013.01); *H04B 10/116* (2013.01); *H04B 10/1149* (2013.01); *H05B 47/19* (2020.01); *H04W 4/02* (2013.01)

(58) Field of Classification Search
CPC ..... H05B 37/03; H05B 37/0272; G01S 1/042; G01S 1/045; H04B 10/1149; H04B 10/116; H04W 4/02
USPC ......................................................... 398/118
See application file for complete search history.

(56) References Cited

U.S. PATENT DOCUMENTS

| | | | | |
|---|---|---|---|---|
| 8,036,244 B2* | 10/2011 | Naoe | .................. | H04L 12/2834 370/469 |
| 8,620,154 B2* | 12/2013 | Li | .................... | H04W 76/19 398/1 |
| 2014/0052390 A1* | 2/2014 | Kim | ..................... | H05B 45/50 702/58 |
| 2015/0078741 A1* | 3/2015 | O'Connor | .............. | H04B 10/69 398/23 |
| 2015/0098709 A1* | 4/2015 | Breuer | ..................... | G06K 9/34 398/118 |
| 2015/0355850 A1* | 12/2015 | Dong | ........................ | G06F 7/00 711/103 |

(Continued)

FOREIGN PATENT DOCUMENTS

EP 3442138 A4 * 4/2019 ......... H04B 10/1149

*Primary Examiner* — Abbas H Alagheband
(74) *Attorney, Agent, or Firm* — Yutian Ling

(57) ABSTRACT

The systems and method disclosed herein include a LCom-enabled luminaire configured to transmit a maintenance trigger encoded in an LCom signal in response to detecting an error or maintenance condition in the LCom-enabled luminaire, receive an access request, transmit maintenance information in response to the access request, and receive correction information to correct the error or maintenance condition. The systems and methods further include a receiver device configured to receive the maintenance trigger, generate the access request based on the maintenance trigger, transmit the access request to the LCom-enabled luminaire, receive maintenance information in response to the access request, and transmit control commands based on the maintenance information.

17 Claims, 8 Drawing Sheets

(56) References Cited

U.S. PATENT DOCUMENTS

| | | | |
|---|---|---|---|
| 2016/0072581 A1* | 3/2016 | Ikehara | H04B 10/116 |
| | | | 398/118 |
| 2017/0099572 A1* | 4/2017 | Breuer | H04B 10/116 |
| 2017/0099718 A1* | 4/2017 | Stout | H05B 47/12 |
| 2017/0104531 A1* | 4/2017 | Aggarwal | G08C 23/04 |
| 2017/0170899 A1* | 6/2017 | Breuer | G06K 9/4661 |
| 2017/0180046 A1* | 6/2017 | Stout | H04B 10/80 |
| 2017/0187456 A1* | 6/2017 | Siessegger | H04B 10/1149 |
| 2017/0188438 A1* | 6/2017 | Vollmer | F21V 5/007 |
| 2018/0006723 A1* | 1/2018 | Noh | H04B 10/116 |
| 2019/0068283 A1* | 2/2019 | Dong | H04B 10/1149 |

* cited by examiner

TRANSMISSION OF LUMINAIRE MAINTENANCE INFORMATION

FIELD OF THE DISCLOSURE

This disclosure relates to light-based communication (LCom), and more specifically to the transmission of maintenance information from luminaires to receiver devices in order to fix or correct an error or maintenance condition.

BACKGROUND

Indoor navigation systems commonly use physical signs and/or radio-frequency (RF) signals to facilitate navigation of buildings or structures. Physical signs may be located throughout a building, such that users can observe each sign along a path to a desired location within the building. RF based navigation systems involve communication signals, such as Wi-Fi signals, for exchanging navigation information with one or more users of the system. These systems often include several RF transmitters (e.g., a BLUETOOTH® Beacon) configured to communicate with users located in or about a building. To ensure sufficient access to the system, these transmitters may be positioned throughout the building.

SUMMARY

Various implementations disclosed herein include a method for initiating maintenance of a light-based communication (LCom) enabled luminaire. The method includes transmitting, by the LCom-enabled luminaire, a maintenance trigger encoded in an LCom signal in response to detecting an error or maintenance condition in the LCom-enabled luminaire, receiving, from a receiver device, an access request based on the maintenance trigger, transmitting, by the LCom-enabled luminaire, maintenance information to the receiver in response to the access request, and receiving control commands to correct the error or maintenance condition.

In some implementations, the maintenance trigger includes at least one of a first key, a uniform resource locator, an Internet Protocol address, and an identifier of the LCom-enabled luminaire. In some implementations, the method further includes determining, by the LCom-enabled luminaire, whether the access request includes a second key, the second key generated by the receiver device based on the maintenance trigger, and granting, by the LCom-enabled luminaire, the receiver device access to the maintenance information in response to determining that the access request includes the second key. In some implementations, the LCom-enabled luminaire grants access to the receiver device for a limited time. In some implementations, the method further includes detecting, by the LCom-enabled luminaire, the error or maintenance condition. In some implementations, the maintenance information includes at least one of an error codes, a current load conditions of a component in the LCom-enabled luminaire, a remaining lifetime of a component in the LCom-enabled luminaire, a log or operational history, and suspected malicious activity. In some implementations, the control commands are received from the receiver device. In some implementations, the control commands are received from a server that controls a plurality of LCom-enabled luminaires.

Further implementations disclosed herein include a method for performing maintenance of a light-based communication (LCom) enabled luminaire. The method includes receiving, by a receiver device, a maintenance trigger encoded in an LCom signal transmitted from the LCom-enabled luminaire, generating, by the receiver device, an access request based on the maintenance trigger, transmitting, from the receiver device, the access request to the LCom-enabled luminaire, receiving, from the LCom-enabled luminaire, maintenance information in response to the access request, and transmitting, by the receiver device, control commands based on the maintenance information.

In some implementations, the maintenance trigger includes at least one of a first key, a uniform resource locator, an Internet Protocol address, and an identifier of the LCom-enabled luminaire. In some implementations, the access request includes a second key, the second key generated by the receiver device based on the maintenance trigger. In some implementations, the maintenance information includes at least one of an error codes, a current load conditions of a component in the LCom-enabled luminaire, a remaining lifetime of a component in the LCom-enabled luminaire, a log or operational history, and suspected malicious activity. In some implementations, the receiver device transmits the control commands to the LCom-enabled luminaire. In some implementations, the receiver device transmits the control commands to a server that controls a plurality of LCom-enabled luminaires. In some implementations, the method further includes receiving, by the receiver device, an access grant from the LCom-enabled luminaire in response to transmitting the access request. In some implementations, the access grant is for a limited time.

Further implementations disclosed herein includes a system for performing maintenance on a light-based communication (LCom) enabled luminaire. The system includes a LCom-enabled luminaire configured to transmit a maintenance trigger encoded in an LCom signal in response to detecting an error or maintenance condition in the LCom-enabled luminaire, receive an access request, transmit maintenance information in response to the access request, and receive correction information to correct the error or maintenance condition. The system further includes a receiver device configured to receive the maintenance trigger, generate the access request based on the maintenance trigger, transmit the access request to the LCom-enabled luminaire, receive maintenance information in response to the access request, and transmit control commands based on the maintenance information.

In some implementations, the maintenance trigger includes at least one of a first key, a uniform resource locator, an Internet Protocol address, and an identifier of the LCom-enabled luminaire. In some implementations, the LCom-enabled luminaire is further configured to determine whether the access request includes a second key, the second key generated by the receiver device based on the maintenance trigger, and grant the receiver device access to the maintenance information in response to determining that the access request includes the second key. In some implementations, the maintenance information includes at least one of an error codes, a current load conditions of a component in the LCom-enabled luminaire, a remaining lifetime of a component in the LCom-enabled luminaire, a log or operational history, and suspected malicious activity.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1:
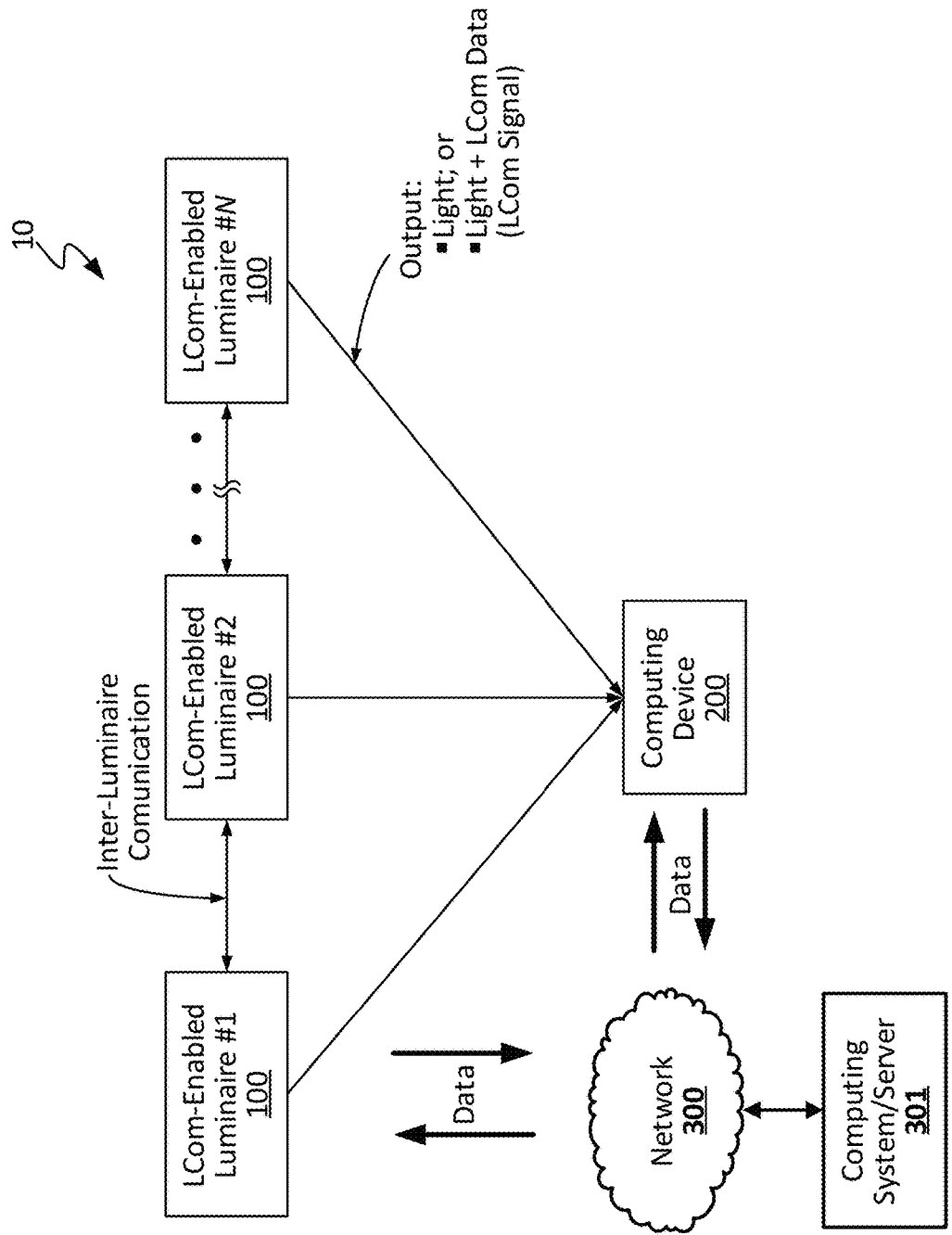
FIG. 1 is a block diagram illustrating an example LCom system configured in accordance with an implementation of the present disclosure.

These and other features of the present implementations will be understood better by reading the following detailed description, taken together with the figures herein described. The accompanying drawings are not intended to be drawn to scale. For purposes of clarity, not every component may be labeled in every drawing.

DETAILED DESCRIPTION

Techniques and architecture are disclosed for performing maintenance on an LCom-enabled luminaire. The implementations disclosed herein include a LCom-enabled luminaire configured to transmit maintenance triggers via LCom signals in response to detecting an error or maintenance condition that should be corrected. The maintenance trigger may include a key, uniform resource locator (URL), Internet Protocol (IP) address, identifier, or other information that may be used to authenticate a receiver device to perform maintenance on the luminaire. A receiver device that receives the maintenance trigger may generate an access request based on the maintenance trigger and transmit the access request to the luminaire. The luminaire may authenticate the receiver device and then transmit detailed maintenance information to the receiver device. The receiver device may generate correction commands to correct the error or maintenance condition based on the maintenance information. The correction commands may be transmitted directly to the luminaire, or to a server/central controller that controls a plurality of LCom-enabled luminaires including the luminaire that transmitted the maintenance trigger.

General Overview

Light-based communication ("LCom") systems for indoor navigation provide enhanced precision and accuracy over other technologies, such as GPS or Wi-Fi. LCom systems include luminaires configured to transmit light encoded with information, such as an identifier associated with each luminaire. A computing device (e.g., a smart phone) may receive the LCom signal via sensors (such as a camera or ambient light sensor) and decode the information. A navigation application executing on the computing device may store and/or retrieve mapping information linking luminaire identifiers to physical locations. Based on this information, the navigation application may determine the location of the computing device within the indoor environment.

Errors may occasionally occur in LCom-enabled luminaires, such as deviations from normal operating conditions (e.g., current overloads), or failure of software or hardware components in the luminaire. In addition, the luminaire may require regular maintenance, such as updating software and drivers, or checking the expected remaining lifetime of the light emitting diodes (LEDs) and other components in the luminaire. However, without a central server that monitors the LCom-enabled luminaires for errors and maintenance conditions, it may be difficult for maintenance personnel to locate the affected luminaire. Also, access to the luminaire controls should be restricted to authorized personnel to prevent malicious activities.

Thus, and in accordance with implementations of the present disclosure, systems and methods are disclosed that allow for secure maintenance of LCom-enabled luminaires. When a luminaire detects an error or maintenance condition, the luminaire may transmit a maintenance trigger via LCom signals. The maintenance trigger may be received and decoded by a receiver device, such as a mobile computing device. The maintenance trigger may indicate that the luminaire requires maintenance and may include a method for authenticating the receiver device to perform maintenance. For example, the maintenance trigger may include a key, URL, IP address, or identifier that allows the receiver device to generate an access request that is accepted by the luminaire. For example, the receiver device may store a key, or other information, that when combined with the information in the maintenance trigger generates a valid access request. The receiver device may transmit the access the request to the luminaire, which authenticates the receiver device based on the receiver device. This prevents unauthorized personnel from accessing and controlling the LCom-enabled luminaire. This also allows maintenance personnel to repair and maintain the luminaire without requiring access to a central server that controls multiple LCom-enabled luminaires.

After authentication, the luminaire may transmit detailed maintenance information to the receiver device via LCom signals or some other communication medium (e.g., Bluetooth, Zigbee, Wi-Fi). The maintenance information may include, for example, error codes, current operating conditions, and current remaining lifetime of various components in the luminaire. Maintenance personnel may use the maintenance information to determine how to repair or maintain the luminaire, and generate one or more control commands to address the error or maintenance condition. The control commands may be transmitted directly to the luminaire, or may be transmitted to a central server that controls multiple LCom-enabled luminaires. The central server may then pass the control commands to the luminaire to perform error correction and maintenance.

System Architecture and Operation

FIG. 1 is a block diagram illustrating an example light-based communication (LCom) system 10 configured in accordance with an implementation of the present disclosure. As can be seen, system 10 may include one or more LCom-enabled luminaires 100 configured for light-based communicative coupling with a receiver computing device 200 via LCom signal(s). As discussed herein, such LCom may be provided, in accordance with some implementations, via visible light-based signals. In some cases, LCom may be provided in one direction; for instance, LCom data may be passed from a given LCom-enabled luminaire 100 (e.g., the transmitter) to a computing device 200 (e.g., the receiver), or from a computing device 200 (e.g., the transmitter) to a given LCom-enabled luminaire 100 (e.g., the receiver). In some other cases, LCom may be provided in a bi-directional fashion between a given LCom-enabled luminaire 100 and a computing device 200, where both act as a transceiver device capable of transmitting and receiving.

In some cases in which system 10 includes a plurality of LCom-enabled luminaires 100, all (or some sub-set thereof) may be configured for communicative coupling with one another so as to provide inter-luminaire communication. In one such scenario, for instance, the inter-luminaire communication can be used to notify other luminaires 100 that a given computing device 200 is currently present, as well as the position information for that particular computing device 200. Such inter-luminaire communication is not needed, however, as will be appreciated in light of this disclosure.

As can be further seen in this example implementation, system 10 allows for communicative coupling with a network 300 and one or more servers or other computer systems 301. Communicative coupling may be provided, for example, between network 300 and computing device 200 and/or one or more LCom-enabled luminaires 100, as desired. The network 300 may be a wireless local area network, a wired local network, or a combination of local wired and wireless networks, and may further include access to a wide area network such as the Internet or a campus-wide network. In short, network 300 can be any communications network.

The computer systems 301 may be any suitable computing system capable of communicating over a network 300, such as a cloud-based server computer, and may be programmed or otherwise configured to provide an LCom related service, according to some implementations. For example, an LCom related service might be that the computer system 301 is configured to provide storage of mobile computing device position information or the position information of the luminaires 100. Numerous other such configurations will be apparent in light of this disclosure.

Figure 2A:
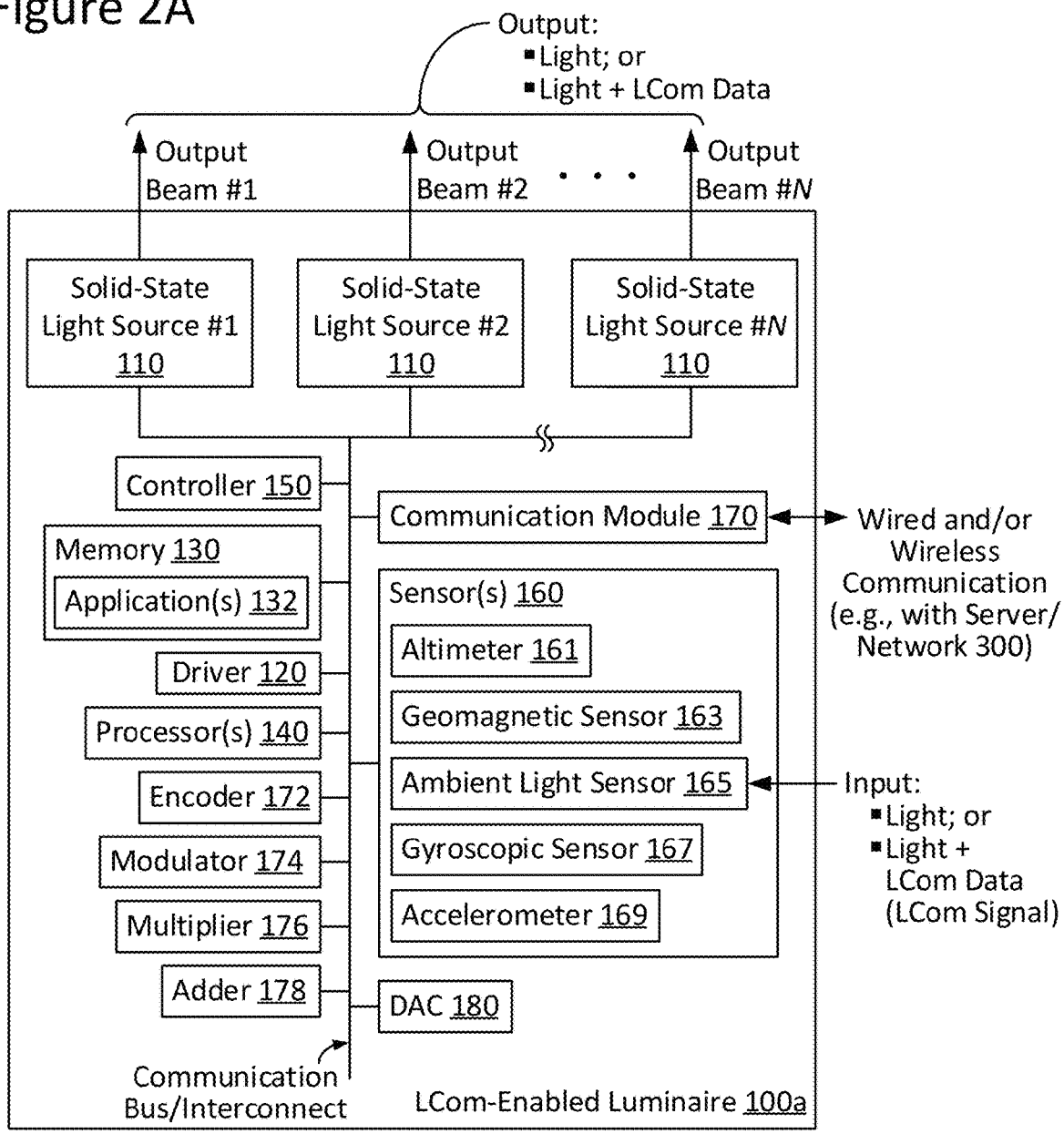
FIG. 2A is a block diagram illustrating an LCom-enabled luminaire configured in accordance with an implementation of the present disclosure.
Figure 2B:
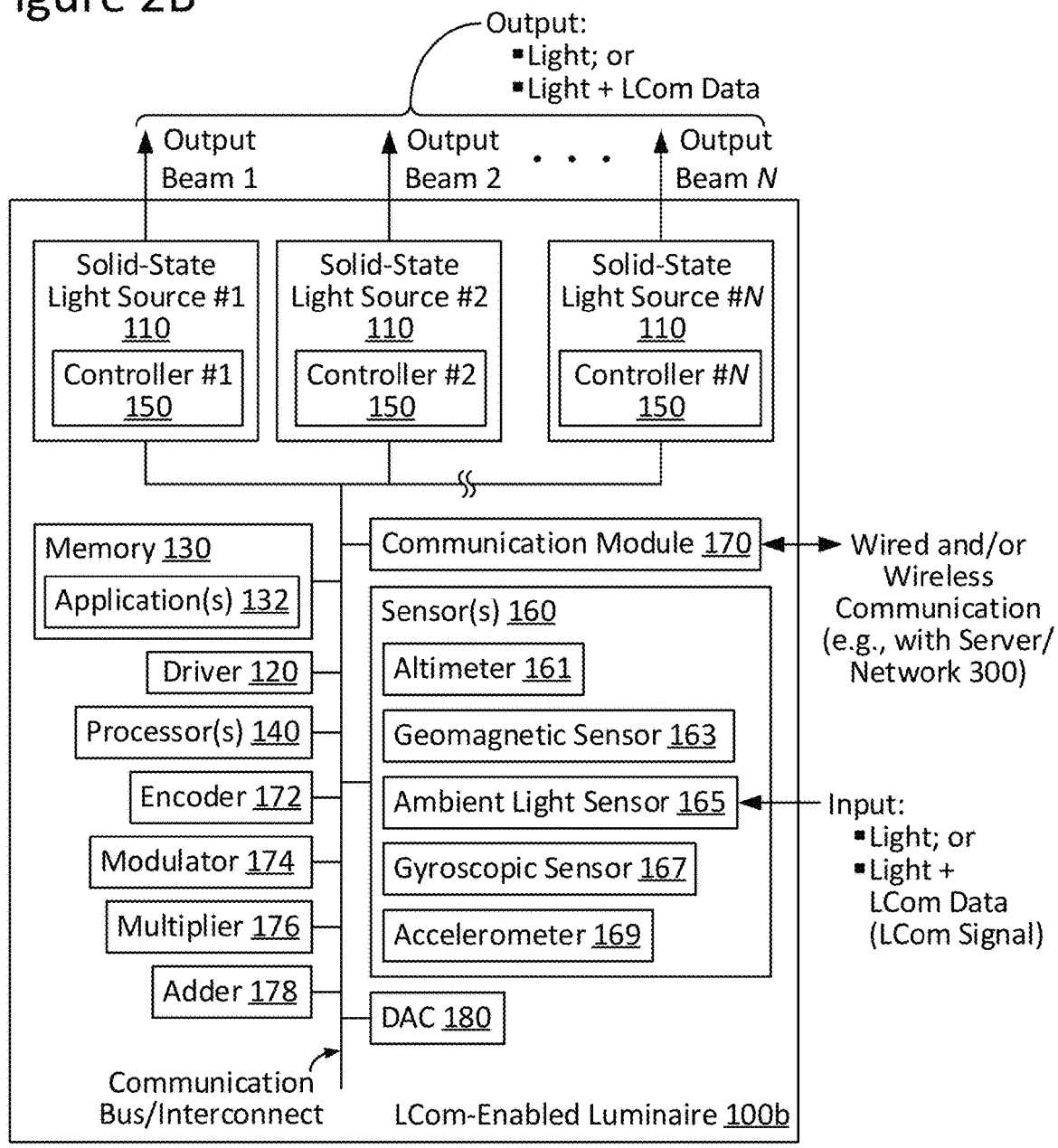
FIG. 2B is a block diagram illustrating an LCom-enabled luminaire configured in accordance with another implementation of the present disclosure.

FIG. 2A is a block diagram illustrating an LCom-enabled luminaire 100a configured in accordance with an implementation of the present disclosure. FIG. 2B is a block diagram illustrating an LCom-enabled luminaire 100b configured in accordance with another implementation of the present disclosure. As can be seen, a difference between luminaire 100a and luminaire 100b is with respect to the location of controller 150. For consistency and ease of understanding of the present disclosure, LCom-enabled luminaires 100a and 100b hereinafter may be collectively referred to generally as an LCom-enabled luminaire 100, except where separately referenced. Further note that while various modules are shown as distinct modules for purposes of illustration, any number of the modules may be integrated with one or more other modules. For instance, the controller 150 may be integrated with the driver 120. Similarly, the processor(s) 140 and memory 130 may be integrated within the controller 150. Numerous other configurations can be used.

With respect to FIGS. 2A-2B, a given solid-state light source 110 may include one or more solid-state emitters, which may be any of a wide range of semiconductor light source devices, such as, for example, a light-emitting diode (LED), an organic light-emitting diode (OLED), a polymer light-emitting diode (PLED), or a combination of any of these. A given solid-state emitter may be configured to emit electromagnetic radiation, for example, from the visible spectral band and/or other portions of the electromagnetic spectrum not limited to the infrared (IR) spectral band and/or the ultraviolet (UV) spectral band, as desired for a given target application or end-use. In some implementations, a given solid-state emitter may be configured for emissions of a single correlated color temperature (CCT) (e.g., a white light-emitting semiconductor light source). In other implementations, a given solid-state emitter may be configured for color-tunable emissions. For instance, in some cases, a given solid-state emitter may be a multi-color (e.g., bi-color, tri-color, etc.) semiconductor light source configured for a combination of emissions, such as: (1) red-green-blue (RGB); (2) red-green-blue-yellow (RGBY); (3) red-green-blue-white (RGBW); (4) dual-white; and/or (5) a combination of any one or more thereof. In some cases, a given solid-state emitter may be configured as a high-brightness light source. In some implementations, a given solid-state emitter may be provided with a combination of any one or more of the aforementioned example emissions capabilities. In any case, a given solid-state emitter can be packaged or non-packaged, as desired, and in some cases may be populated on a printed circuit board (PCB) or other suitable intermediate/substrate. In some cases, power and/or control connections for a given solid-state emitter may be routed from a given PCB to a driver 120 (discussed in turn below) and/or other devices/componentry, as desired. Other suitable configurations for the one or more solid-state emitters of a given solid-state light source 110 will depend on a given application and will be apparent in light of this disclosure.

A given solid-state light source 110 also may include one or more optics optically coupled with its one or more solid-state emitters. In accordance with some implementations, the optic(s) of a given solid-state light source 110 may be configured to transmit the one or more wavelengths of interest of the light (e.g., visible, UV, IR, etc.) emitted by solid-state emitter(s) optically coupled therewith. To that end, the optic(s) may include an optical structure (e.g., a window, lens, dome, etc.) formed from any of a wide range of optical materials, such as, for example: (1) a polymer, such as poly(methyl methacrylate) (PMMA) or polycarbonate; (2) a ceramic, such as sapphire ($Al_2O_3$) or yttrium aluminum garnet (YAG); (3) a glass; and/or (4) a combination of any one or more thereof. In some cases, the optic(s) of a given solid-state light source 110 may be formed from a single (e.g., monolithic) piece of optical material to provide a single, continuous optical structure. In some other cases, the optic(s) of a given solid-state light source 110 may be formed from multiple pieces of optical material to provide a multi-piece optical structure. In some cases, the optic(s) of a given solid-state light source 110 may include optical features, such as, for example: (1) an anti-reflective (AR) coating; (2) a reflector; (3) a diffuser; (4) a polarizer; (5) a brightness enhancer; (6) a phosphor material (e.g., which converts light received thereby to light of a different wavelength); and/or (7) a combination of any one or more thereof. In some implementations, the optic(s) of a given solid-state light source 110 may be configured, for example, to focus and/or collimate light transmitted there through. Other suitable types, optical transmission characteristics, and configurations for the optic(s) of a given solid-state light source 110 will depend on a given application and will be apparent in light of this disclosure.

In accordance with some implementations, the one or more solid-state light sources 110 of a given LCom-enabled luminaire 100 may be electronically coupled with a driver 120. In some cases, driver 120 may be an electronic driver (e.g., single-channel; multi-channel) configured, for example, for use in controlling one or more solid-state emitters of a given solid-state light source 110. For instance, in some implementations, driver 120 may be configured to control the on/off state, dimming level, color of emissions, correlated color temperature (CCT), and/or color saturation of a given solid-state emitter (or grouping of emitters) in order to transmit a LCom signal. To such ends, driver 120 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of driver 120 to adjust AC voltage to driver 120); and/or (8) a combination of any one or more thereof. Other suitable configurations for driver 120 and lighting control/driving techniques will depend on a given application and will be apparent in light of this disclosure.

As will be appreciated in light of this disclosure, a given solid-state light source 110 also may include or otherwise be operatively coupled with other circuitry/componentry, for example, which may be used in solid-state lighting. For instance, a given solid-state light source 110 (and/or host LCom-enabled luminaire 100) may be configured to host or otherwise be operatively coupled with any of a wide range of electronic components, such as: (1) power conversion circuitry (e.g., electrical ballast circuitry to convert an AC signal into a DC signal at a desired current and voltage to power a given solid-state light source 110); (2) constant current/voltage driver componentry; (3) transmitter and/or receiver (e.g., transceiver) componentry; and/or (4) local processing componentry. When included, such componentry may be mounted, for example, on one or more driver 120 boards, in accordance with some implementations.

As can be further seen from FIGS. 2A-2B, a given LCom-enabled luminaire 100 may include memory 130 and one or more processors 140. Memory 130 can be of any suitable type (e.g., RAM and/or ROM, or other suitable memory) and size, and in some cases may be implemented with volatile memory, non-volatile memory, or a combination thereof. A given processor 140 may be configured as typically done, and in some implementations may be configured, for example, to perform operations associated with a given host LCom-enabled luminaire 100 and one or more of the applications 132 thereof (e.g., within memory 130 or elsewhere). In some cases, memory 130 may be configured to be utilized, for example, for processor workspace (e.g., for one or more processors 140) and/or to store media, programs, applications, and/or content on a host LCom-enabled luminaire 100 on a temporary or permanent basis. In one example implementation, the memory 130 stores a database of identifiers that the luminaire 100 may transmit via LCom signals.

The one or more applications 132 stored in memory 130 can be accessed and executed, for example, by the one or more processors 140 of a given LCom-enabled luminaire 100. In accordance with some implementations, a given application 132 can be implemented in any suitable standard and/or custom/proprietary programming language, such as, for example: (1) C; (2) C++; (3) objective C; (4) JavaScript; and/or (5) any other suitable custom or proprietary instruction sets. In a more general sense, the applications 132 can be instructions encoded on any suitable non-transitory machine-readable medium that, when executed by one or more processors 140, carries out functionality of a given LCom-enabled luminaire 100, in part or in whole.

In accordance with some implementations, the one or more solid-state light sources 110 of a given LCom-enabled luminaire 100 can be electronically controlled, for example, to output light and light encoded with LCom data (e.g., an LCom signal). To that end, a given LCom-enabled luminaire 100 may include or otherwise be communicatively coupled with one or more controllers 150. In some such example implementations, such as that illustrated in FIG. 2A, a controller 150 may be hosted by a given LCom-enabled luminaire 100 and operatively coupled (e.g., via a communication bus/interconnect) with the one or more solid-state light sources 110 (1-N) of that LCom-enabled luminaire 100. In this example case, controller 150 may output a digital control signal to any one or more of the solid-state light sources 110 and may do so, for example, based on wired and/or wireless input received from a given local source (e.g., such as on-board memory 130) and/or remote source (e.g., such as a control interface or network 300). As a result, a given LCom-enabled luminaire 100 may be controlled in such a manner as to output any number of output beams (1-N), which may include light in the form of LCom data, as desired for a given target application or end-use. However, the present disclosure is not so limited.

For example, in some other implementations, such as that illustrated in FIG. 2B, a controller 150 may be packaged or otherwise hosted, in part or in whole, by a given solid-state light source 110 of a given LCom-enabled luminaire 100 and operatively coupled (e.g., via a communication bus/interconnect) with the one or more solid-state light sources 110. If LCom-enabled luminaire 100 includes a plurality of such solid-state light sources 110 hosting their own controllers 150, then each such controller 150 may be considered, in a sense, a mini-controller, providing LCom-enabled luminaire 100 with a distributed controller 150. In some implementations, controller 150 may be populated, for example, on one or more PCBs of the host solid-state light source 110. In this example case, controller 150 may output a digital control signal to an associated solid-state light source 110 of LCom-enabled luminaire 100 and may do so, for example, based on wired and/or wireless input received from a given local source (e.g., such as on-board memory 130) and/or remote source (e.g., such as a control interface, optional network 300, etc.). As a result, LCom-enabled luminaire 100 may be controlled in such a manner as to output any number of output beams (1-N), which may include light in the form of LCom data, as desired for a given target application or end-use.

In accordance with some implementations, a given controller 150 may host one or more lighting control modules and can be programmed or otherwise configured to output one or more control signals, for example, to adjust the operation of the solid-state emitter(s) of a given solid-state light source 110 to communicate luminaire position via an identifier. For example, in some cases, a given controller 150 may be configured to output a control signal to control whether the light beam of a given solid-state emitter is on/off. In some instances, a given controller 150 may be configured to output a control signal to control the intensity/brightness (e.g., dimming; brightening) of the light emitted by a given solid-state emitter. In some cases, a given controller 150 may be configured to output a control signal to control the color (e.g., mixing; tuning) of the light emitted by a given solid-state emitter. Thus, if a given solid-state light source 110 includes two or more solid-state emitters configured to emit light having different wavelengths, the control signal may be used to adjust the relative brightness of the different solid-state emitters in order to change the mixed color output by that solid-state light source 110. In some implementations, controller 150 may be configured to output a control signal to encoder 172 (discussed below) to facilitate encoding of LCom data for transmission by a given LCom-enabled luminaire 100. In some implementations, controller 150 may be configured to output a control signal to modulator 174 (discussed below) to facilitate modulation of LCom signals for transmission by a given LCom-enabled luminaire 100. Other suitable configurations and control signal output for a given controller 150 of a given LCom-enabled luminaire 100 will depend on a given application and will be apparent in light of this disclosure.

In accordance with some implementations, a given LCom-enabled luminaire 100 may include an encoder 172. In some implementations, encoder 172 may be configured, for example, to encode LCom data in preparation for transmission thereof by the host LCom-enabled luminaire 100. To that end, encoder 172 may be provided with any suitable configuration, as will be apparent in light of this disclosure.

In accordance with some implementations, a given LCom-enabled luminaire 100 may include a modulator 174. In some implementations, modulator 174 may be configured, for example, to modulate an LCom signal in preparation for transmission thereof by the host LCom-enabled luminaire 100. In some implementations, modulator 174 may be a single-channel or multi-channel electronic driver (e.g., driver 120) configured, for example, for use in controlling the output of the one or more solid-state emitters of a given solid-state light source 110. In some implementations, modulator 174 may be configured to control the on/off state, dimming level, color of emissions, correlated color temperature (CCT), and/or color saturation of a given solid-state emitter (or grouping of emitters). To such ends, modulator 174 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of modulator 174 to adjust AC voltage to modulator 174); and/or (8) any other suitable lighting control/driving technique, as will be apparent in light of this disclosure. Other suitable configurations and control/driving techniques for modulator 174 will depend on a given application and will be apparent in light of this disclosure.

In accordance with some implementations, a given LCom-enabled luminaire 100 may include a multiplier 176. Multiplier 176 may be configured as typically done, and in some example implementations may be configured to combine an input received from an upstream modulator 174 with an input received from an ambient light sensor 165 (discussed below). In some instances, multiplier 176 may be configured to increase and/or decrease the amplitude of a signal passing there through, as desired. Other suitable configurations for multiplier 176 will depend on a given application and will be apparent in light of this disclosure.

In accordance with some implementations, a given LCom-enabled luminaire 100 may include an adder 178. Adder 178 may be configured as typically done, and in some example implementations may be configured to combine an input received from an upstream multiplier 178 with a DC level input. In some instances, adder 178 may be configured to increase and/or decrease the amplitude of a signal passing there through, as desired. Other suitable configurations for adder 178 will depend on a given application and will be apparent in light of this disclosure.

In accordance with some implementations, a given LCom-enabled luminaire 100 may include a digital-to-analog converter (DAC) 180. DAC 180 may be configured as typically done, and in some example implementations may be configured to convert a digital control signal into an analog control signal to be applied to a given solid-state light source 110 of the host LCom-enabled luminaire 100 to output an LCom signal therefrom. Note that DAC 180 may further be integrated into controller 150, in some implementations. Other suitable configurations will be apparent in light of this disclosure.

In accordance with some implementations, a given LCom-enabled luminaire 100 may include one or more sensors 160. In some implementations, a given LCom-enabled luminaire 100 optionally may include an altimeter 161. When included, altimeter 161 may be configured as typically done, and in some example implementations may be configured to aid in determining the altitude of a host LCom-enabled luminaire 100 with respect to a given fixed level (e.g., a floor, a wall, the ground, or other surface). In some implementations, a given LCom-enabled luminaire 100 optionally may include a geomagnetic sensor 163. When included, geomagnetic sensor 163 may be configured as typically done, and in some example implementations may be configured to determine the orientation and/or movement of a host LCom-enabled luminaire 100 relative to a geomagnetic pole (e.g., geomagnetic north) or other desired heading, which may be customized as desired for a given target application or end-use. In some implementations, a given LCom-enabled luminaire 100 optionally may include an ambient light sensor 165. When included, ambient light sensor 165 may be configured as typically done, and in some example implementations may be configured to detect and measure ambient light levels in the surrounding environment of the host LCom-enabled luminaire 100. In some cases, ambient light sensor 165 may be configured to output a signal, for example, to a multiplier 176 of LCom-enabled luminaire 100. In some implementations, a given LCom-enabled luminaire 100 optionally may include a gyroscopic sensor 167. When included, gyroscopic sensor 167 may be configured as typically done, and in some example implementations may be configured to determine the orientation (e.g., roll, pitch, and/or yaw) of the host LCom-enabled luminaire 100. In some implementations, a given LCom-enabled luminaire 100 optionally may include an accelerometer 169. When included, accelerometer 169 may be configured as typically done, and in some example implementations may be configured to detect motion of the host LCom-enabled luminaire 100. In any case, a given sensor 160 of a given host LCom-enabled luminaire 100 may include mechanical and/or solid-state componentry, as desired for a given target application or end-use. Also, it should be noted that the present disclosure is not so limited only to these example optional sensors 160, as additional and/or different sensors 160 may be provided as desired for a given target application or end-use, in accordance with some other implementations, or no sensors 160 may be provided, as the case may be. Numerous configurations will be apparent in light of this disclosure.

In accordance with some implementations, a given LCom-enabled luminaire 100 may include a communication module 170, which may be configured for wired (e.g., Universal Serial Bus or USB, Ethernet, FireWire, etc.) and/or wireless (e.g., Wi-Fi, Bluetooth, etc.) communication, as desired. In accordance with some implementations, communication module 170 may be a transceiver or other network interface circuit configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; and/or (6) a combination of any one or more thereof. It should be noted, however, that the present disclosure is not so limited to only these example communications protocols, as in a more general sense, and in accordance with some implementations, any suitable communications protocol, wired and/or wireless, standard and/or custom/proprietary, may be utilized by communication module 170, as desired for a given target application or end-use. In some instances, communication module 170 may be configured to facilitate inter-luminaire communication between LCom-enabled luminaires 100. In addition or alternatively, communication module 170 may be configured so as to allow for receipt of information from network 300, such as luminaire position or estimated mobile computing device position information. As explained herein, the estimated mobile computing device position information associated with the computing device 200 can be used by the luminaire to compute luminaire position. Whether the estimated mobile computing device position is computed in real time at the luminaire or received from somewhere else, the estimated mobile computing device position information can then be used to generate the LCom signals emitted by that luminaire 100 to communicate luminaire position to passing computing devices 200. The communication module 170 may be configured to use any suitable wired and/or wireless transmission technologies (e.g., radio frequency, or RF, transmission; infrared, or IR, light modulation; etc.), as desired for a given target application or end-use. These transmission technologies may be implemented with a transceiver, for example a Bluetooth Beacon, integrated with or connected to the communications module 170. Other suitable configurations for communication module 170 will depend on a given application and will be apparent in light of this disclosure.

Figure 3:
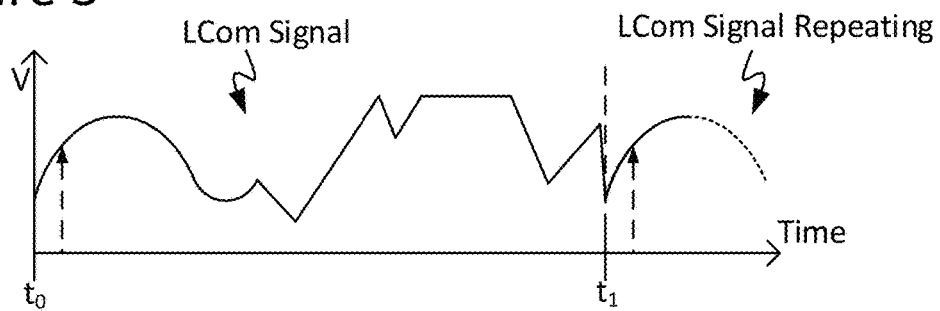
FIG. 3 illustrates an example arbitrary LCom signal as may be transmitted by an LCom-enabled luminaire, in accordance with an implementation of the present disclosure.

As previously noted, a given LCom-enabled luminaire 100 may be configured, in accordance with some implementations, to output light encoded with LCom data (e.g., an LCom signal). FIG. 3 illustrates an example arbitrary LCom signal as may be transmitted by an LCom-enabled luminaire 100, in accordance with an implementation of the present disclosure. As can be seen here, LCom-enabled luminaire 100 may be configured to transmit a given LCom signal over a given time interval ($t_1$-$t_0$). In some cases, a given LCom-enabled luminaire 100 may be configured to repeatedly output its one or more LCom signals.

Figure 4:
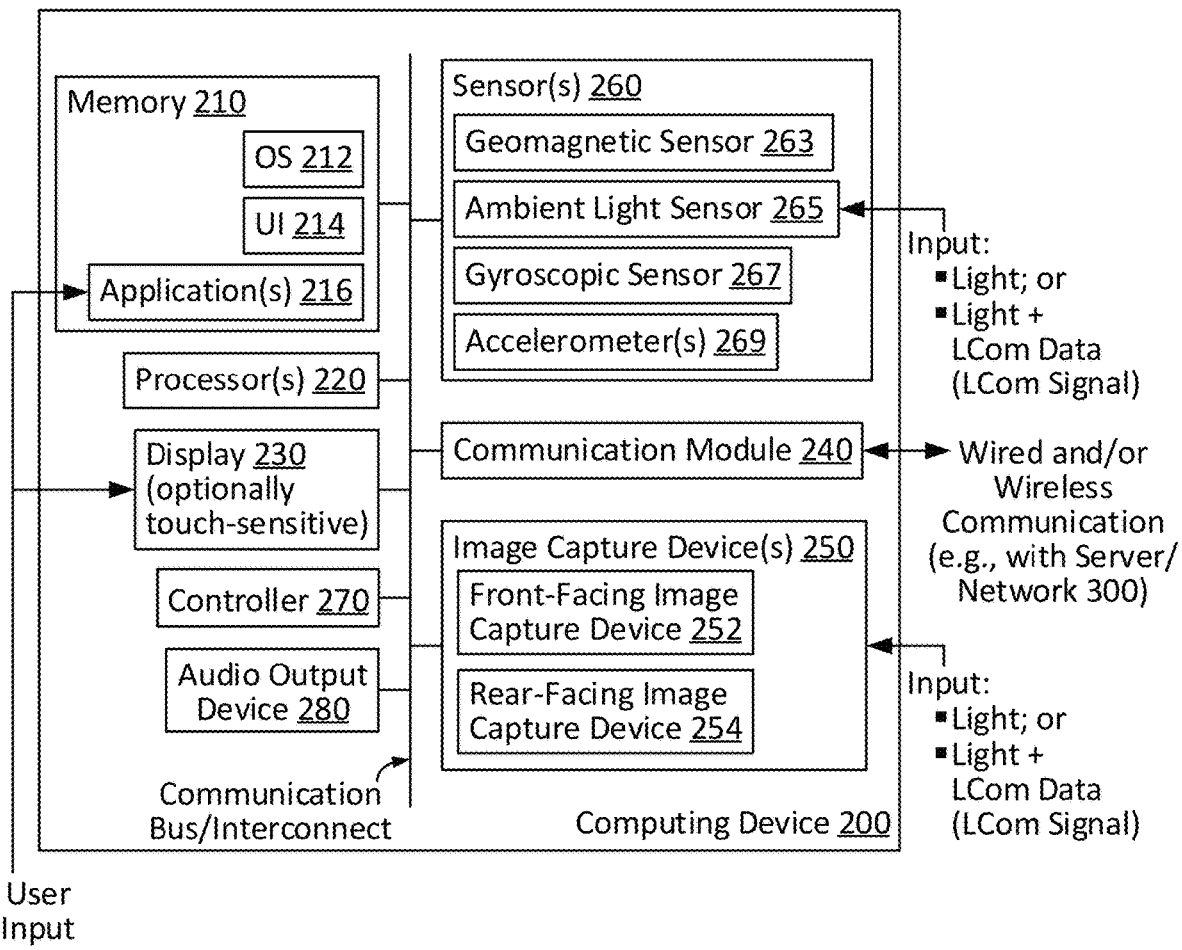
FIG. 4 illustrates an example computing device configured in accordance with an implementation of the present disclosure.

FIG. 4 illustrates an example computing device 200 configured in accordance with an implementation of the present disclosure. As discussed herein, computing device 200 may be configured, in accordance with some implementations: (1) to detect the light pulses of an LCom signal; (2) to decode the LCom data from a detected LCom signal. To these ends, computing device 200 can be any of a wide range of computing platforms, mobile or otherwise. For example, in accordance with some implementations, computing device 200 can be, in part or in whole: (1) a laptop/notebook computer or sub-notebook computer; (2) a tablet or phablet computer; (3) a mobile phone or smartphone; (4) a personal digital assistant (PDA); (5) a portable media player (PMP); (6) a cellular handset; (7) a handheld gaming device; (8) a gaming platform; (9) a desktop computer; (10) a television set; (11) a wearable or otherwise body-borne computing device, such as a smartwatch, smart glasses, or smart headgear; and/or (12) a combination of any one or more thereof. Other suitable configurations for computing device 200 will depend on a given application and will be apparent in light of this disclosure.

As can be further seen from FIG. 4, computing device 200 may include memory 210 and one or more processors 220. Memory 210 can be of any suitable type (e.g., RAM and/or ROM, or other suitable memory) and size, and in some cases may be implemented with volatile memory, non-volatile memory, or a combination thereof. A given processor 220 of computing device 200 may be configured as typically done, and in some implementations may be configured, for example, to perform operations associated with computing device 200 and one or more of the modules thereof (e.g., within memory 210 or elsewhere). In some cases, memory 210 may be configured to be utilized, for example, for processor workspace (e.g., for one or more processors 220) and/or to store media, programs, applications, and/or content on computing device 200 on a temporary or permanent basis. The one or more modules stored in memory 210 (e.g., such as OS 212, UI 214, and/or one or more applications 216) can be accessed and executed, for example, by the one or more processors 220 of computing device 200. Just as explained with respect to memory 130 of the luminaires 100, memory 210 of the device 200 may include information that can be used to compute or otherwise calculate an estimated mobile computing device location, as will be appreciated in light of this disclosure.

Operating System (OS) 212 can be implemented with any suitable OS, mobile or otherwise, such as, for example: (1) Android OS from Google, Inc.; (2) iOS from Apple, Inc.; (3) BlackBerry OS from BlackBerry Ltd.; (4) Windows Phone OS from Microsoft Corp; (5) Palm OS/Garnet OS from Palm, Inc.; (6) an open source OS, such as Symbian OS; and/or (7) a combination of any one or more thereof. As will be appreciated in light of this disclosure, OS 212 may be configured, for example, to aid in processing LCom data during its flow through computing device 200. Other suitable configurations and capabilities for OS 212 will depend on a given application and will be apparent in light of this disclosure. A user interface (UI) module 214 is provided as commonly done, and generally allows for user interaction with the computing device 200 (e.g., such as a graphical touched-based UI on various smartphones and tablets). Any number of user interface schemes can be used.

In accordance with some implementations, memory 210 may have stored therein (or otherwise have access to) one or more applications 216. In some instances, computing device 200 may be configured to receive input, for example, via one or more applications 216 stored in memory 210 (e.g., such as an indoor navigation application). In accordance with some implementations, a given application 216 can be implemented in any suitable standard and/or custom/proprietary programming language, such as, for example: (1) C; (2) C++; (3) objective C; (4) JavaScript; and/or (5) any other suitable custom or proprietary instruction sets. In a more general sense, the applications 216 can be instructions encoded on any suitable non-transitory machine-readable medium that, when executed by one or more processors 220, carries out functionality of a given computing device 200, in part or in whole. In one example implementation, at least one of these applications 216 may be a navigation application configured to receive LCom signals, decode the LCom signals to extract information such as luminaire identifiers, and determine the position of the computing device 200 based on the luminaire identifiers and a map that associates luminaire identifiers with the physical locations of the luminaires. In addition, at least one application 216 may be further configured to also monitor the luminaire for any changes (orientation, with respect to computing device 200). Likewise, in some implementations, the at least one application 216 may be further configured to optionally try to adjust its own settings to optimize decoding in effort to deal with situations where control by luminaire 100 is not available, for whatever reason.

As can be seen further from FIG. 4, computing device 200 may include a display 230, in accordance with some implementations. Display 230 can be any electronic visual display or other device configured to display or otherwise generate an image (e.g., image, video, text, and/or other displayable content) there at. In some instances, display 230 may be integrated, in part or in whole, with computing device 200, whereas in some other instances, display 230 may be a stand-alone component configured to communicate with computing device 200 using any suitable wired and/or wireless communications means. In some cases, display 230 optionally may be a touchscreen display or other touch-sensitive display. To that end, display 230 may utilize any of a wide range of touch-sensing techniques, such as, for example: (1) resistive touch-sensing; (2) capacitive touch-sensing; (3) surface acoustic wave (SAW) touch-sensing; (4) infrared (IR) touch-sensing; (5) optical imaging touch-sensing; and/or (6) a combination of any one or more thereof. In a more general sense, and in accordance with some implementations, an optionally touch-sensitive display 230 generally may be configured to detect or otherwise sense direct and/or proximate contact from a user's finger, stylus, or other suitable implement at a given location of that display 230. In some cases, an optionally touch-sensitive display 230 may be configured to translate such contact into an electronic signal that can be processed by computing device 200 (e.g., by the one or more processors 220 thereof) and manipulated or otherwise used to trigger a given UI action. In some cases, a touch-sensitive display 230 may facilitate user interaction with computing device 200 via the UI 214 presented by such display 230. Numerous suitable configurations for display 230 will be apparent in light of this disclosure.

In accordance with some implementations, computing device 200 may include a communication module 240, which may be a transceiver or other network interface circuit configured for wired (e.g., Universal Serial Bus or USB, Ethernet, FireWire, etc.) and/or wireless (e.g., Wi-Fi, Bluetooth, etc.) communication using any suitable wired and/or wireless transmission technologies (e.g., radio frequency, or RF, transmission; infrared, or IR, light modulation; etc.), as desired. In accordance with some implementations, communication module 240 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; (6) a near field communication (NFC) protocol; (7) a local area network (LAN)-based communication protocol; (8) a cellular-based communication protocol; (9) an Internet-based communication protocol; (10) a satellite-based communication protocol; and/or (11) a combination of any one or more thereof. It should be noted, however, that the present disclosure is not so limited to only these example communications protocols, as in a more general sense, and in accordance with some implementations, any suitable communications protocol, wired and/or wireless, standard and/or custom/proprietary, may be utilized by communication module 240, as desired for a given target application or end-use. In some instances, communication module 240 may be configured to communicate with one or more LCom-enabled luminaires 100 via network 300. Numerous suitable configurations for communication module 240 will depend on a given application and will be apparent in light of this disclosure.

Also, as can be seen from FIG. 4, computing device 200 may include one or more image capture devices 250, such as a front-facing image capture device 252 and/or a rear-facing image capture device 254, in accordance with some implementations. For consistency and ease of understanding of the present disclosure, front-facing image capture device 252 and rear-facing image capture device 254 hereinafter may be collectively referred to generally as an image capture device 250, except where separately referenced. A given image capture device 250 can be any device configured to capture digital images, such as a still camera (e.g., a camera configured to capture still photographs) or a video camera (e.g., a camera configured to capture moving images including a plurality of frames). In some cases, a given image capture device 250 may include typical components such as, for instance, an optics assembly, an image sensor, and/or an image/video encoder, and may be integrated, in part or in whole, with computing device 200. A given image capture device 250 can be configured to operate using light, for example, in the visible spectrum and/or other portions of the electromagnetic spectrum not limited to the infrared (IR) spectrum, ultraviolet (UV) spectrum, etc. In some instances, a given image capture device 250 may be configured to continuously acquire imaging data. As described herein, a given image capture device 250 of computing device 200 may be configured, in accordance with some implementations, to detect the light and/or LCom signal output of a transmitting LCom-enabled luminaire 100. In some instances, a given image capture device 250 may be, for example, a camera like one typically found in smartphones or other mobile computing devices. Numerous other suitable configurations for a given image capture device 250 (e.g., front-facing image capture device 252; rear-facing image capture device 254) of computing device 200 will depend on a given application and will be apparent in light of this disclosure.

In accordance with some implementations, computing device 200 may include one or more sensors 260. In some implementations, computing device 200 optionally may include a geomagnetic sensor 263. When included, geomagnetic sensor 263 may be configured as typically done, and in some example implementations may be configured to determine the orientation and/or movement of a host computing device 200 relative to a geomagnetic pole (e.g., geomagnetic north) or other desired heading, which may be customized as desired for a given target application or end-use. In some implementations, computing device 200 optionally may include an ambient light sensor 265. When included, ambient light sensor 265 may be configured as typically done, and in some example implementations may be configured to detect and measure ambient light levels in the surrounding environment of the host computing device 200. In some implementations, computing device 200 optionally may include a gyroscopic sensor 267. When included, gyroscopic sensor 267 may be configured as typically done, and in some example implementations may be configured to determine the orientation (e.g., roll, pitch, and/or yaw) of the host computing device 200. In some implementations, computing device 200 optionally may include an accelerometer 269. When included, accelerometer 269 may be configured as typically done, and in some example implementations may be configured to detect motion of the host computing device 200. As a result of using these inertial sensors, the computing device 200 may provide highly accurate position information. The accuracy of this position information may result in improved navigation system operation, because the luminaire position determined using the information from the multiple data points from the inertial sensors will likely be more accurate than a luminaire position calculated using a single data point. In any case, a given sensor 260 of a given host computing device 200 may include mechanical and/or solid-state componentry, as desired for a given target application or end-use. Also, it should be noted that the present disclosure is not so limited only to these example optional sensors 260, as additional and/or different sensors 260 may be provided, as desired for a given target application or end-use, in accordance with some other implementations. Numerous sensor configurations for device 200 will be apparent in light of this disclosure.

In accordance with some implementations, computing device 200 may include or otherwise be communicatively coupled with one or more controllers 270. A given controller 270 may be configured to output one or more control signals to control any one or more of the various components/modules of computing device 200 and may do so, for example, based on wired and/or wireless input received from a given local source (e.g., such as on-board memory 210) and/or remote source (e.g., such as a control interface, optional network 300, etc.). In accordance with some implementations, a given controller 270 may host one or more control modules and can be programmed or otherwise configured to output one or more control signals, for example, to adjust the operation of a given portion of computing device 200. For example, in some cases, a given controller 270 may be configured to output a control signal to control operation of a given image capture device 250, and/or to output a control signal to control operation of one or more sensors 260. Numerous other configurations and control signal output for a given controller 270 of computing device 200 will depend on a given application and will be apparent in light of this disclosure.

As can be seen further from FIG. 4, computing device 200 may include an audio output device 280, in accordance with some implementations. Audio output device 280 can be, for example, a speaker or any other device capable of producing sound from an audio data signal, in accordance with some implementations. Audio output device 280 can be configured, for example, to reproduce sounds local to and/or received by its host computing device 200. In some instances, audio output device 280 may be integrated, in part or in whole, with computing device 200, whereas in some other instances, audio output device 280 may be a stand-alone component configured to communicate with computing device 200 using any suitable wired and/or wireless communications means, as desired. Numerous other suitable types and configurations for audio output device 280 will depend on a given application and will be apparent in light of this disclosure.

Network 300 can be any suitable public and/or private communications network. For instance, in some cases, network 300 may be a private local area network (LAN) operatively coupled to a wide area network (WAN), such as the Internet. In some cases, network 300 may include one or more second-generation (2G), third-generation (3G), fourth-generation (4G), and/or fifth-generation (G) mobile communication technologies. In some cases, network 300 may include a wireless local area network (WLAN) (e.g., Wi-Fi wireless data communication technologies). In some instances, network 300 may include Bluetooth wireless data communication technologies. In some cases, network 300 may include supporting infrastructure and/or functionalities, such as a server and a service provider (e.g., computer system 301), but such features are not necessary to carry out communication via network 300. In some instances, computing device 200 may be configured for communicative coupling, for example, with a network 300 and one or more LCom-enabled luminaires 100. In some cases, computing device 200 may be configured to receive data from network 300, for example, which serves to supplement LCom data received by computing device 200 from a given LCom-enabled luminaire 100. In some instances, computing device 200 may be configured to receive data (e.g., such as known reference position information, luminaire position, luminaire identifiers, and/or other data pertaining to a given LCom-enabled luminaire 100) from network 300 that facilitates navigation via one or more LCom-enabled luminaires 100. Numerous configurations for network 300 will be apparent in light of this disclosure.

Figure 5:
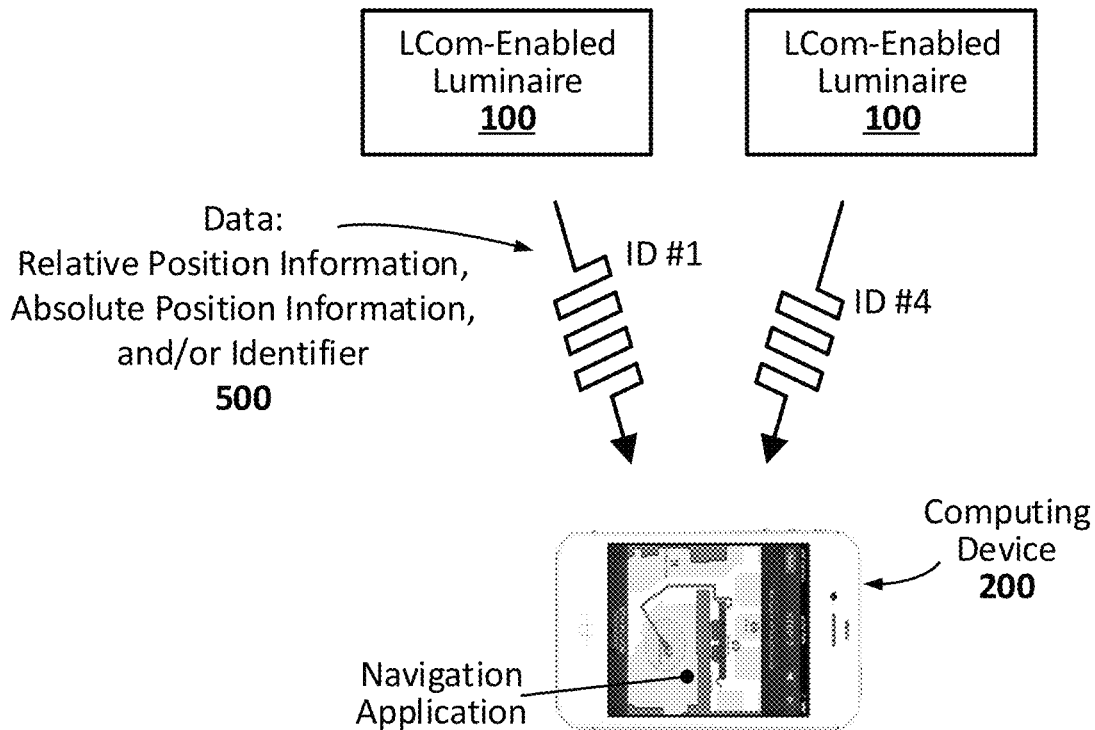
FIG. 5 illustrates an example LCom system, including an LCom-enabled luminaire and a computing device, in accordance with an implementation of the present disclosure.

FIG. 5 illustrates an example LCom system, including an LCom-enabled luminaire and a computing device, in accordance with an implementation of the present disclosure. As can be seen, this example scenario includes two luminaires 100 each communicating with a computing device 200, which happens to be a smartphone running an LCom-based navigation application. The navigation application can be, for instance, one of the applications 216 stored in memory 210 and executed by processor(s) 220. As can be further seen, the LCom signals being communicated include data 500, which generally includes position information, which may be used to navigate. For instance, if the user is receiving light from a specific luminaire 100 that has a known location, then the navigation application 'knows' where the user is and can continue to guide the user along the targeted path.

The position information 500 transmitted by the luminaires 100 may come in any number of forms. For instance, in some implementations, the luminaire positions may be communicated as a relative position (e.g., relative to another luminaire 100, or some other object having a known position), and/or as an absolute position (e.g., x-y coordinates of a grid-based map). In still other implementations, the luminaire position may be communicated as an identifier, in which the transmitted ID translates to a specific location on a given map of the environment being navigated. In some such example cases, for instance, a luminaire might use dual tone multi frequency (DTMF) encoding, which means it continuously sends two unique frequencies. In some implementations, the luminaire position may be communicated via a fiducial pattern as described herein.

Figure 6:
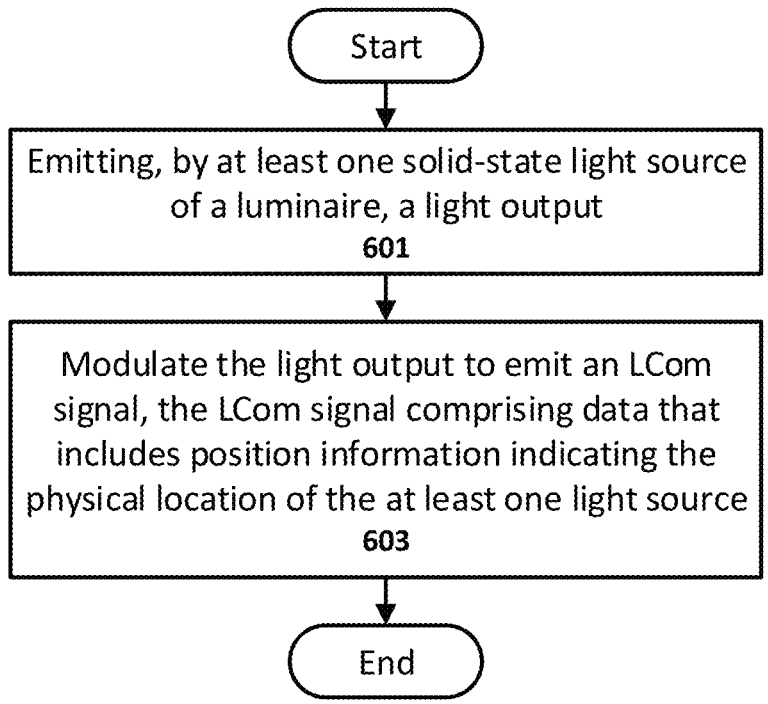
FIG. 6 illustrates an example method for emitting position information from an LCom-enabled luminaire, in accordance with an implementation of the present disclosure.

FIG. 6 illustrates an example method for emitting position information from an LCom-enabled luminaire, in accordance with an implementation of the present disclosure. As can be seen, the method includes emitting 601, by at least one solid-state light source of a luminaire, a light output. The method further includes modulating 603 the light output to emit an LCom signal, the LCom signal including data that includes position information indicating the physical location of the at least one light source. According to some implementations, this position information may indicate that particular luminaire's location directly by virtue of relative or absolute position information, as previously explained. In other implementations, this position information may indicate that particular luminaire's location indirectly by virtue of an identifier that translates to a specific location on a given map of the environment being navigated. Numerous other implementations and variations using luminaires having known locations within a given area to be navigated will be apparent in light of this disclosure.

Performing Maintenance on an LCom-Enabled Luminaire

Figure 7:
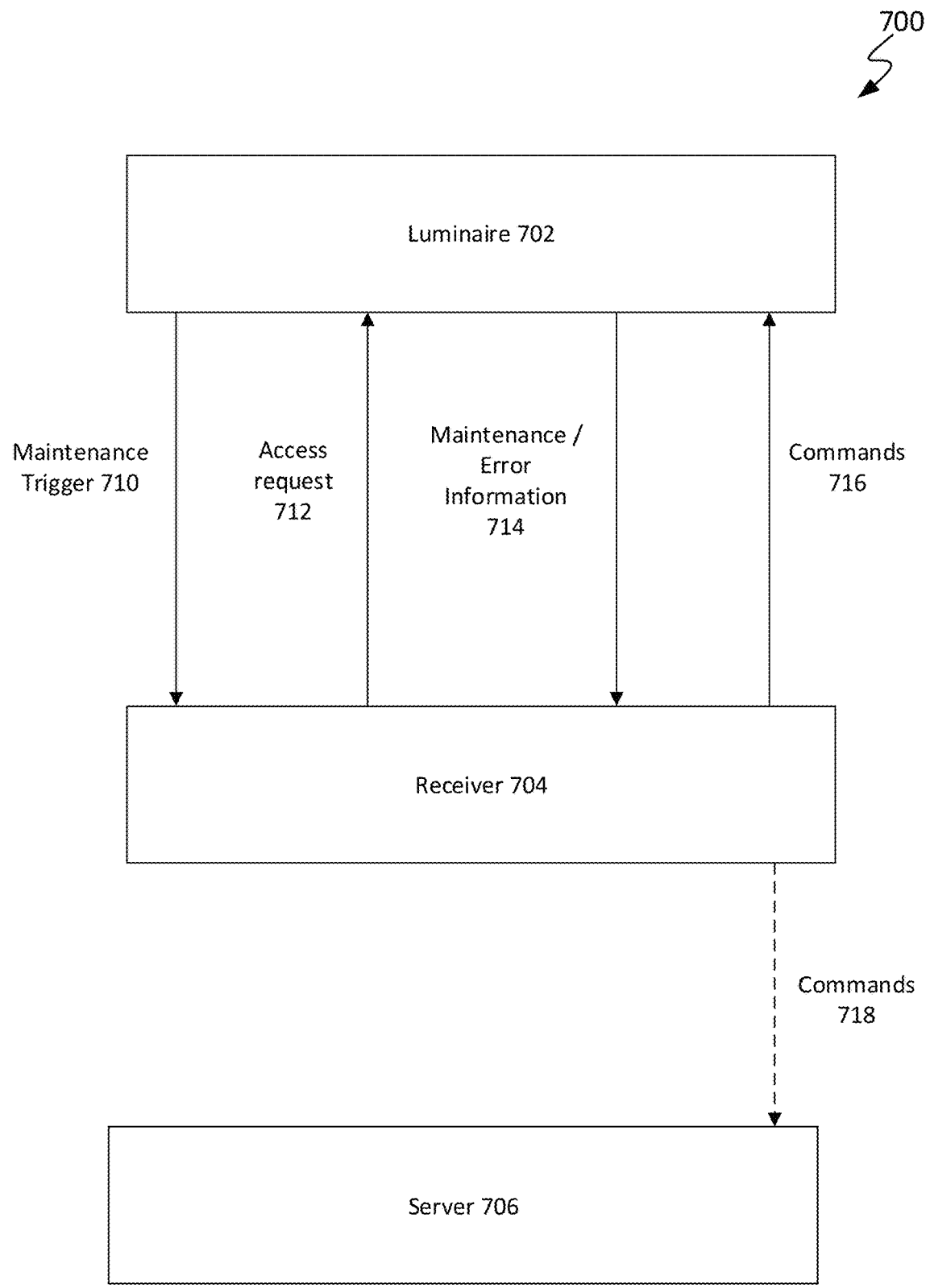
FIG. 7 is a block diagram illustrating an example LCom system for communicating maintenance information in accordance with an implementation of the present disclosure.

FIG. 7 is a block diagram illustrating an example system 700 that enables maintenance of LCom-enabled luminaires in accordance with various implementations of the present disclosure. The system 700 includes one or more LCom-enabled luminaires 702. Only one LCom-enabled luminaire 702 is shown in FIG. 7, but the system 700 may include a plurality of LCom-enabled luminaires 702 configured in similar fashion. For example, the LCom-enabled luminaire 702 may be configured similarly to LCom-enabled luminaires 100a or 100b in FIGS. 2A-2B. The system 700 may also include a receiver 704, which may be configured similarly to computing device 200 in FIG. 4. The system 700 may also optionally include a server 706, which may be configured similarly to computing system/server 301 in FIG. 1.

The LCom-enabled luminaire 702 may be configured to detect errors or maintenance conditions. Errors or maintenance conditions may arise from, for example, a failure of a software or hardware component in the LCom-enabled luminaire 702, overloading of current or voltage in one or more components of the LCom-enabled luminaire 702, or reaching an expected lifetime of one or more components in the LCom-enabled luminaire 702.

Once the LCom-enabled luminaire 702 detects an error or maintenance condition, it may transmit a maintenance trigger 710 via LCom signals. The maintenance trigger 710 may signal to an authorized device, such as the receiver 704, that maintenance should be performed on the LCom-enabled luminaire 702 and may provide the receiver 704 with a way to gain access to the LCom-enabled luminaire 702. For example, the maintenance trigger 710 may include a key, a URL, an IP address, or a luminaire identifier for the LCom-enabled luminaire 702. The LCom-enabled luminaire 702 may also disconnect itself from a central server that normally controls the LCom-enabled luminaire 702 as a security or safety measure.

Maintenance personnel in the vicinity of the LCom-enabled luminaire 702 may receive the maintenance trigger 710 using the receiver 704. An application executing on the receiver 704, such as luminaire maintenance and control software, may decode the maintenance trigger 710. The receiver 704 may generate an access request 712 to gaining access/control of the LCom-enabled luminaire 702 based on the maintenance trigger 710. For example, if the maintenance trigger 710 contains a first key, the access request 712 may include a second key that corresponds to the first key. The second key may be stored in memory on the receiver 704, and may be provided to receivers/maintenance personnel that are authorized to perform maintenance. In another example, if the maintenance trigger 710 includes a URL or IP address, the receiver 704 may navigate to the URL or IP address and input login information to receive the second key to include in the access request 712. In another example, if the maintenance trigger 710 includes a luminaire identifier, the receiver 704 may store keys associated with different luminaire identifiers and look-up the key associated with the received identifier, or could generate a key using the luminaire identifier (e.g., a hash function that produces a valid key). In some implementations, the access request 712 may include the first key transmitted by the LCom-enabled luminaire 702.

Once the receiver 704 has generated the access request 712, it may transmit the access request to the LCom-enabled luminaire 702. Transmission may occur using LCom signals, or another communications medium (e.g., Bluetooth, Zigbee, Wi-Fi). Once the LCom-enabled luminaire 702 receives the access request 712, it may authenticate the access request 712 to ensure that the receiver 704 is authorized to perform maintenance on the LCom-enabled luminaire 702. For example, the LCom-enabled luminaire 702 may extract the second key from the access request 712 and verify that the key is valid. In some implementations, the LCom-enabled luminaire 702 may grant the access request for a limited time (e.g., 2 hours) in order to reduce the risk on unauthorized access to the LCom-enabled luminaire 702.

Once the receiver 704 has been authenticated, the LCom-enabled luminaire 702 may transmit detailed maintenance/error information 714 to the receiver 704. The maintenance/error information 714 may be transmitted via LCom signals, or through another communications medium. The maintenance/error information 714 may include, but is not limited to, error codes, current load conditions (e.g., voltage, current) of various components in the LCom-enabled luminaire 702, remaining lifetimes of various components in the LCom-enabled luminaire 702, logs or operational history, and suspected malicious activity (e.g., unauthorized access attempts). The LCom-enabled luminaire 702 may also transmit additional non-maintenance information, such as luminaire identifiers, commissioning information, sensor data, or any other data that may be stored in the LCom-enabled luminaire 702. In some implementations, the LCom-enabled luminaire 702 may transmit the maintenance/error information 714 for a limited time, such that unauthorized devices cannot intercept such information if maintenance personnel leave before fixing the error or maintenance condition.

After receiving the maintenance/error information 714, maintenance personnel using the receiver 704 may diagnose the error or maintenance condition and formulate a response to fix or address the error or maintenance condition. This may include generating one or more control commands 716 to adjust operating parameters of the LCom-enabled luminaire 702, collect more information, update software, or other functions. In some implementations, the receiver 704 may transmit additional control commands for other purposes, such as for commissioning, set-up, diagnosis, recalibration, etc. In some implementations, the receiver 704 may communicate the commands 716 directly to the LCom-enabled luminaire 702. In other implementations, the receiver 704 may communicate the commands 716 to the server 706. The server 706 may control and monitor a plurality of LCom-enabled luminaires, and the server 706 may assist maintenance personnel with diagnosing and repairing the LCom-enabled luminaire 702.

Figure 8:
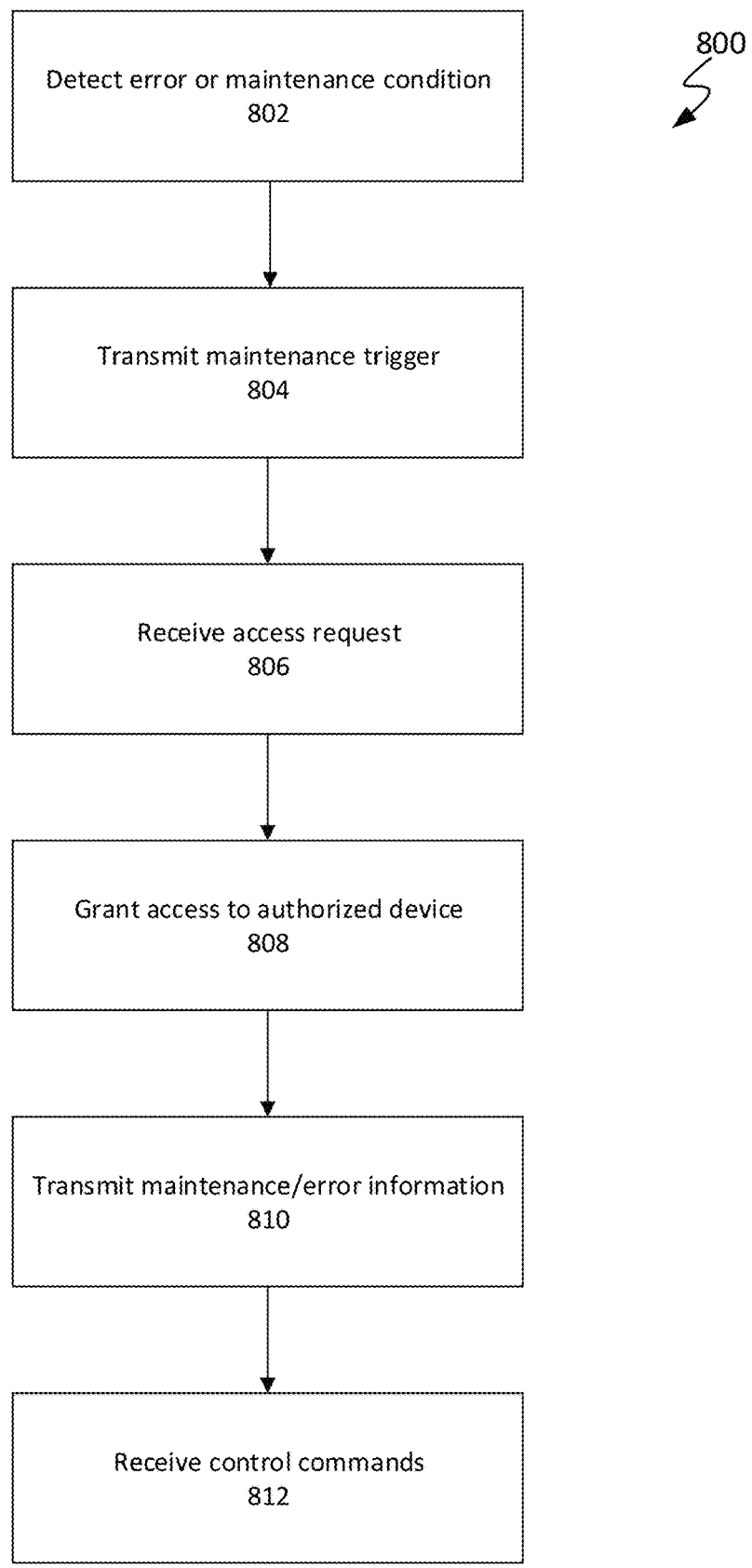
FIG. 8 illustrates a method of initiating maintenance of an LCom-enabled luminaire in accordance with an implementation of the present disclosure.

FIG. 8 illustrates a method 800 for initiating maintenance of an LCom-enabled luminaire according to various implementations. The method 800 may be performed by an LCom-enabled luminaire, such as LCom-enabled luminaire 702 in FIG. 7.

In block 802, the LCom-enabled luminaire may detect an error or maintenance condition. Error or maintenance conditions may include, but are not limited to, a failure of a software or hardware component, overloading of current or voltage in one or more components, or reaching an expected lifetime of one or more components. In some implementations, if the LCom-enabled luminaire is normally connected to a central server that controls the LCom-enabled luminaire, the LCom-enabled luminaire may disconnect itself from the server once it detects the error or maintenance condition.

In block 804, the LCom-enabled luminaire may transmit a maintenance trigger via LCom signals that indicates that the LCom-enabled luminaire requires maintenance. The maintenance trigger may include a key, a URL, an IP address, an identifier, or other information that may allow an authorized receiver device to generate a valid access request for the LCom-enabled luminaire.

In block 806, the LCom-enabled luminaire may receive an access request from a receiver that received the maintenance trigger. In block 808, the LCom-enabled luminaire authenticates the access request and grants access to the receiver to perform maintenance functions on the LCom-enabled luminaire. For example, the LCom-enabled luminaire may decode any keys or other authentication information in the access request and verifies the validity of the key or authentication information. In some implementations, the LCom-enabled luminaire may grant the access request to the receiver for a limited time.

In block 810, the LCom-enabled luminaire may transmit maintenance/error information to the authorized receiver. The maintenance/error information may include, but is not limited to, error codes, current load conditions (e.g., voltage, current) of various components in the LCom-enabled luminaire, remaining lifetimes of various components in the LCom-enabled luminaire, logs or operational history, and suspected malicious activity (e.g., unauthorized access attempts). In some implementations, the LCom-enabled luminaire may also transmit additional non-maintenance information to the receiver.

In block 812, the LCom-enabled luminaire may receive control commands, which are used to repair or address the error or maintenance condition. The LCom-enabled luminaire may receive the control commands from the receiver directly, or from a central server that receives the commands from the receiver. In some implementations, the LCom-enabled luminaire may also receive additional control commands from the receiver directed towards other functionality, such as commissioning, set-up, calibration, etc.

Figure 9:
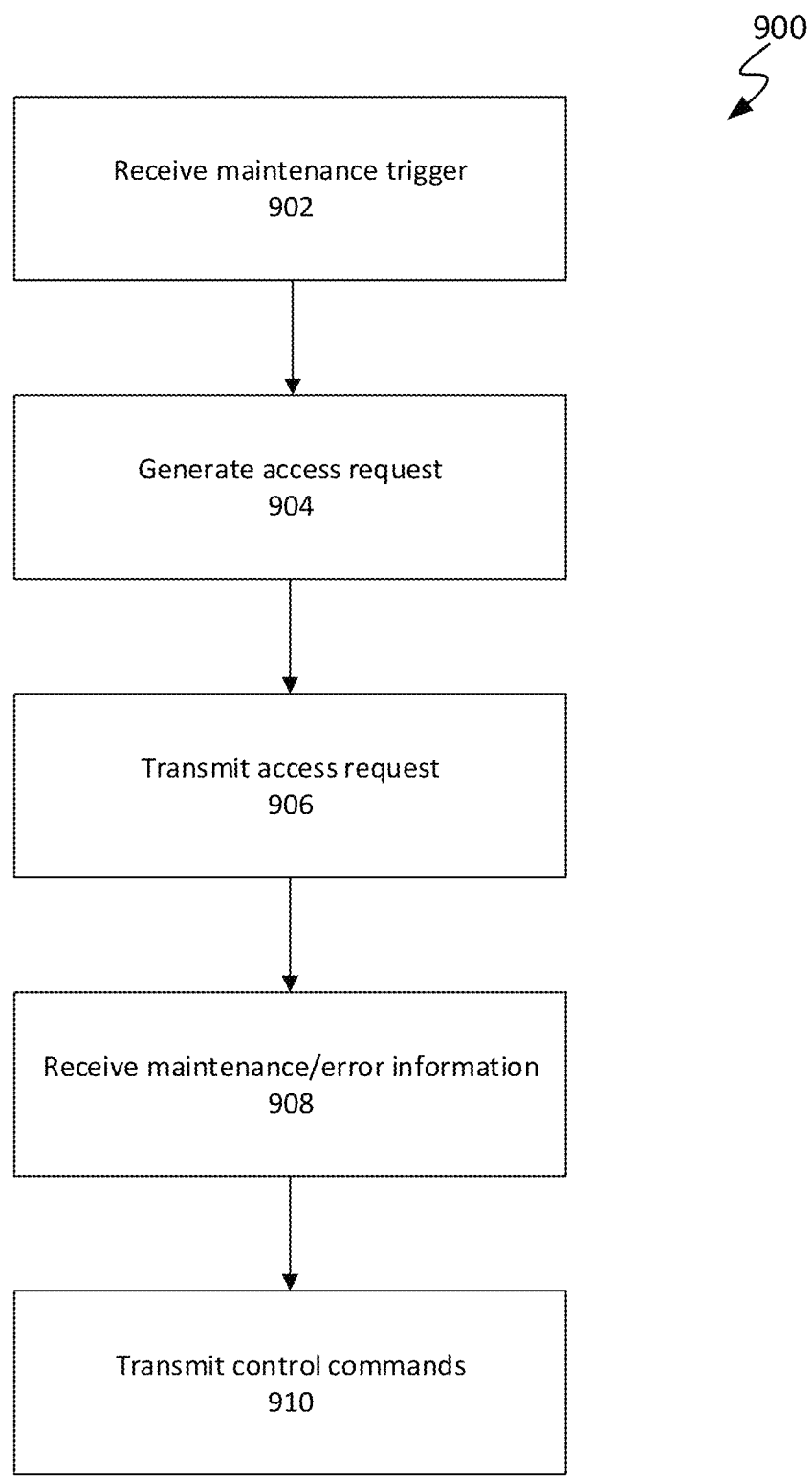
FIG. 9 illustrates a method of performing maintenance on an LCom-enabled luminaire in accordance with an implementation of the present disclosure.

FIG. 9 illustrates a method 900 for performing maintenance of an LCom-enabled luminaire according to various implementations. The method 900 may be performed by a computing device, such as receiver 704 in FIG. 7.

In block 902, the receiver may receive a maintenance trigger from an LCom-enabled luminaire via LCom signals. The maintenance trigger indicates that the LCom-enabled luminaire requires maintenance. The maintenance trigger may include a key, a URL, an IP address, an identifier, or other information that may allow an authorized receiver device to generate a valid access request for the LCom-enabled luminaire.

In block 904, the receiver may generate an access request from the maintenance trigger. For example, the receiver may obtain a second key based on the key or luminaire identifier in the maintenance trigger, or from the URL or IP address in the maintenance trigger. The second key may be provided to the receiver beforehand such that the receiver is authorized to perform maintenance on the LCom-enabled luminaire. In block 906, the receiver transmits the access request to the LCom-enabled luminaire that transmitted the maintenance trigger.

In block 908, the receiver may receive maintenance/error information from the LCom-enabled luminaire once the luminaire authenticates the receiver. The maintenance/error information may include, but is not limited to, error codes, current load conditions (e.g., voltage, current) of various components in the LCom-enabled luminaire, remaining lifetimes of various components in the LCom-enabled luminaire, logs or operational history, and suspected malicious activity (e.g., unauthorized access attempts).

In block 910, the maintenance personnel may generate control commands for repairing or addressing the error or maintenance condition, and the receiver may transmit the control commands. The receiver may transmit the control commands directly to the LCom-enabled luminaire, or to a central server that controls and monitors a plurality of LCom-enabled luminaires. In some implementations, the receiver may also transmit additional control commands directed towards other functionality, such as commissioning, set-up, calibration, etc.

Further Considerations

The foregoing description of the implementations of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

What is claimed is:

1. A method for initiating maintenance of a light-based communication (LCom) enabled luminaire, comprising:
   transmitting, by the LCom-enabled luminaire, a maintenance trigger encoded in an LCom signal in response to detecting an error or maintenance condition in the LCom-enabled luminaire;
   receiving, from a receiver device, an access request based on the maintenance trigger;
   determining, by the LCom-enabled luminaire, whether the access request includes a second key, the second key generated by the receiver device based on the maintenance trigger;
   granting, by the LCom-enabled luminaire, the receiver device access to the maintenance information in response to determining that the access request includes the second key;
   transmitting, by the LCom-enabled luminaire, maintenance information to the receiver in response to the access request; and
   receiving control commands to correct the error or maintenance condition.

2. The method of claim 1, wherein the maintenance trigger comprises at least one of a first key, a uniform resource locator, an Internet Protocol address, and an identifier of the LCom-enabled luminaire.

3. The method of claim 1, wherein the LCom-enabled luminaire grants access to the receiver device for a limited time.

4. The method of claim 1, the method further comprising:
detecting, by the LCom-enabled luminaire, the error or maintenance condition.

5. The method of claim 1, wherein the maintenance information comprises at least one of an error codes, a current load conditions of a component in the LCom-enabled luminaire, a remaining lifetime of a component in the LCom-enabled luminaire, a log or operational history, and suspected malicious activity.

6. The method of claim 1, wherein the control commands are received from the receiver device.

7. The method of claim 1, wherein the control commands are received from a server that controls a plurality of LCom-enabled luminaires.

8. A method for performing maintenance of a light-based communication (LCom) enabled luminaire, comprising:
receiving, by a receiver device, a maintenance trigger encoded in an LCom signal transmitted from the LCom-enabled luminaire;
generating, by the receiver device, an access request based on the maintenance trigger, wherein the access request includes a second key, the second key generated by the receiver device based on the maintenance trigger;
transmitting, from the receiver device, the access request to the LCom-enabled luminaire;
receiving, from the LCom-enabled luminaire, maintenance information in response to the access request; and
transmitting, by the receiver device, control commands based on the maintenance information.

9. The method of claim 8, wherein the maintenance trigger comprises at least one of a first key, a uniform resource locator, an Internet Protocol address, and an identifier of the LCom-enabled luminaire.

10. The method of claim 8, wherein the maintenance information comprises at least one of an error codes, a current load conditions of a component in the LCom-enabled luminaire, a remaining lifetime of a component in the LCom-enabled luminaire, a log or operational history, and suspected malicious activity.

11. The method of claim 8, wherein the receiver device transmits the control commands to the LCom-enabled luminaire.

12. The method of claim 8, wherein the receiver device transmits the control commands to a server that controls a plurality of LCom-enabled luminaires.

13. The method of claim 8, the method further comprising:
receiving, by the receiver device, an access grant from the LCom-enabled luminaire in response to transmitting the access request.

14. The method of claim 13, wherein the access grant is for a limited time.

15. A system for performing maintenance on a light-based communication (LCom) enabled luminaire, the system comprising:
a LCom-enabled luminaire configured to:
transmit a maintenance trigger encoded in an LCom signal in response to detecting an error or maintenance condition in the LCom-enabled luminaire;
receive an access request;
determine whether the access request includes a second key, the second key generated by the receiver device based on the maintenance trigger;
grant the receiver device access to the maintenance information in response to determining that the access request includes the second key;
transmit maintenance information in response to the access request; and
receive correction information to correct the error or maintenance condition; and
a receiver device configured to:
receive the maintenance trigger;
generate the access request based on the maintenance trigger;
transmit the access request to the LCom-enabled luminaire;
receive maintenance information in response to the access request; and
transmit control commands based on the maintenance information.

16. The system of claim 15, wherein the maintenance trigger comprises at least one of a first key, a uniform resource locator, an Internet Protocol address, and an identifier of the LCom-enabled luminaire.

17. The system of claim 15, wherein the maintenance information comprises at least one of an error codes, a current load conditions of a component in the LCom-enabled luminaire, a remaining lifetime of a component in the LCom-enabled luminaire, a log or operational history, and suspected malicious activity.

* * * * *